TUNED MULTI-STAGE AMPLIFIER
Filed July 25, 1963
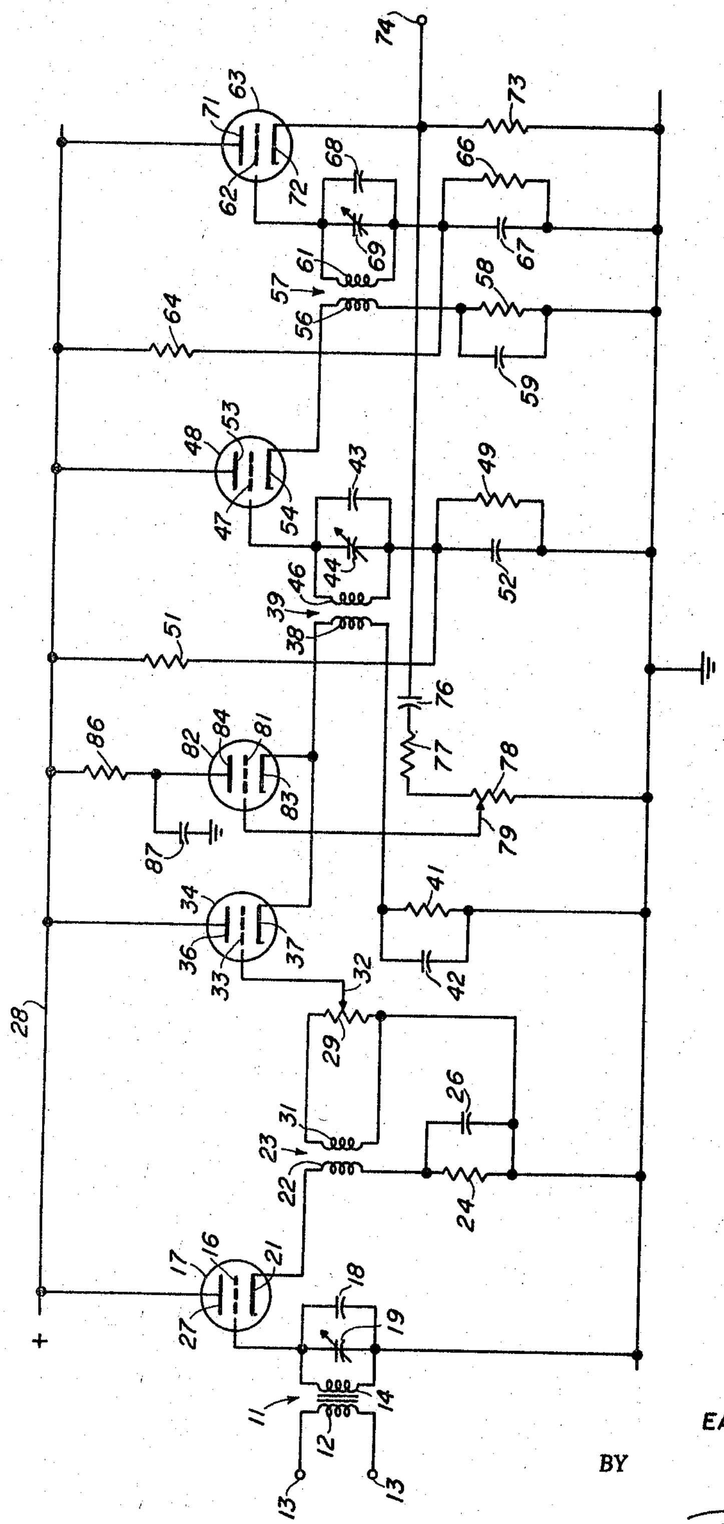
INVENTOR.
EARL G. HEDGER
BY
Paul W. Critchlow
ATTORNEYS United States Patent Office 3,317,852

Patented May 2, 1967

3,317,852

TUNED MULTI-STAGE AMPLIFIER

Earl G. Hedger, San Diego, Calif., assignor to the United States of America as represented by the Secretary of the Navy Filed July 25, 1963, Ser. No. 297,726
2 Claims. (Cl. 330—168)

The invention described herein may be manufactured and used by or for the Government of the United States of America for governmental purposes without the payment of any royalties thereon or therefor.

The present invention relates to a tuned multi-stage amplifier having a large dynamic range.

In numerous applications, particularly in the very low frequency band, conventional tuned amplifiers have been found unsuitable for numerous reasons. In the VLF band, antenna tuning is usually quite sharp which necessitates phase modulation as opposed to the wide band requirements of amplitude or frequency modulation. In a conventional amplifier where the input signal varies over a wide dynamic range it has been found that the inherent phase shift of the amplifier will also vary over a wide range. Hence, in applications where phase shift is important, for example, in the detection of phase modulated signals, this changing phase shift within the amplifier itself is highly undesirable and renders accurate reception of intelligence impossible.

According to the present invention, a tuned amplifier is provided which is entirely cathode coupled or comprises a plurality of cathode or emitter followers. Each stage is transformer coupled to the following stage through a primary winding in serial relationship with the cathode of the preceding stage, and a secondary winding supplying the signal voltage to the following control element (a control grid in the case of vacuum tube active elements or a base in the case of transistor active elements). The secondary of the transformer forms the inductance of a parallel tuned circuit for the tuning of each stage. Due to the cathode or emitter follower ararngement there is no voltage gain achieved in the active elements, and the entire voltage gain takes place through a step-up ratio in each of the coupling transformers. Bandwidth is controlled by an adjustable degenerative feedback from one of the cathodes to another cathode in the chain of amplifiers. The greater the feedback, the wider the bandwidth and, of course, the lower the amplification. Hence, the bandwidth may be varied to accommodate various signal and background noise conditions.

It is thus an object of the present invention to provide a tuned multi-stage amplifier which is extremely stable and has a relatvely high voltage gain.

Another object is a provision of a tuned multi-stage amplifier with an extremely low inherent phase shift characteristic.

A further object of the invention is to provide a tuned multi-stage amplifier which can accommodate a wide range of input signal amplitudes.

Still another object is the provision of a tuned multi-stage amplifier with an adjustable bandwidth.

Yet another object of the present invention is to provide a tuned multi-stage amplifier which is simple, inexpensive and requires a minimum of maintenance and adjustment.

Other objects and many of the attendant advantages of this invention will be readily appreciated as the same becomes better understood by reference to the following detailed description when considered in conjunction with the accompanying drawings wherein:

The sole figure is a schematic representation of a preferred embodiment of the instant invention.

Referring to the drawings, input transformer 11 has primary winding 12 connected to input terminals 13.

Secondary winding 14 has one end connected to control grid 16 of triode 17 and the other end connected to ground. Capacitor 18 is connected in parallel with secondary winding 14 as is trimmer capacitor 19. Cathode 21 of triode 17 is connected through primary winding 22 of transformer 23. The other end of primary winding 22 is connected through resistance 24 and bypass capacitor 26 to ground. Plate 27 of triode 17 is connected to positive bus 28. Resistance 29 is connected across secondary winding 31 of tranformer 23. Sliding contact 32 on resistance 29 is connected to control grid 33 of an active element, triode 34.

Plate 36 of triode 34 is connected to positive bus 28. Cathode 37 of triode 34 is connected to primary winding 38 of transformer 39. The other end of primary winding 38 is connected through resistance 41 to ground, bypass capacitor 42 is connected across resistance 41. Capacitor 43 and trimmer capacitor 44 are connected in parallel with secondary winding 46 of transformer 39. One end of winding 46 is connected to control grid 47 of an active element, triode 48. The other end of winding 46 is connected to a junction of resistance 49 and 51. Bypass capacitor 52 is connected between the junction of resistances 49 to 51 to ground. The other end of resistance 49 is connected to ground. The other end of resistance 51 is connected to positive bus 28.

Plate 53 of triode 48 is connected to positive bus 28, cathode 54 of triode 48 is connected through primary winding 56 of transformer 57 to one end of resistance 58. The other end of resistance 58 is connected to ground. Capacitor 59 is connected across resistance 58. Secondary winding 61 of transformer 57 has one end connected to control grid 62 of an active element, triode 63. The other end of winding 61 is connected to a junction of resistance 64 and resistance 66. Capacitor 67 is connected between this junction and ground, as is the other end of resistance 66. The other end of resistance 64 is connected to positive bus 28. Capacitor 68 and trimmer 69 are connected in parallel with secondary winding 61. Plate 71 is connected to positive bus 28. Cathode 72 of triode 63 is connected through resistance 73 to ground. Output terminal 74 is also connected to cathode 72. Capacitance 76 is connected between cathode 72 of triode 63 and resistance 77. The other end of resistance 77 is connected through resistance 78 to ground. Sliding contact 79 on variable resistance 78 is connected to control grid 81 of active control means, triode 82. Cathode 83 of triode 82 is connected to cathode 37 of triode 34. Plate 84 is connected through resistance 86 to positive bus 28 and through capacitor 87 to ground.

*Operation*

The operation will be described with reference to use in the very low frequency range, although it is emphasized that the instant invention can be used as an amplifier in any frequency range from very low frequency to very high frequency.

An incoming signal from an antenna, for example, at terminals 13 is stepped up in voltage across transformer 11 and the parallel tuned circuit comprising secondary winding 14, capacitor 18 and trimmer capacitor 19, and applied between grid 16 and ground. Triodes 17, 34, 48 and 63 are all operated as cathode followers and, as such, no voltage amplification takes place across the cathode loads. The primary winding 22 of transformer 23 is in series with cathode 21 which couples the signal voltage to secondary winding 31. The circuit of secondary winding 31 instead of being a tuned circuit is set up as a gain or volume control by virtue of sliding contact 32 on resistance 29. Triode 34 again acts as a cathode follower supplying signal current to the primary 38 of transformer 39. The secondary winding 46 of transformer 39 together with capacitance 43 and trimmer 44 forms a tuned circuit supplying signal voltage to grid 47 of triode 48. Triode 48 also acts as a cathode follower with primary winding 56 in series with cathode 54 supplying secondary winding 61 which also is a part of a tuned circuit together with capacitance 68 and trimmer 69. This tuned circuit supplies the signal voltage to grid 62 of the output cathode follower triode 63. The output of the entire network is taken at output terminal 74 which is the cathode 72 of triode 63.

The two input triodes 17 and 34 have control grids which are returned to D.C. ground potential, the bias being obtained by bias resistors 24 and 41, respectively. These resistors are bypassed by capacitors 26 and 42, respectively. In these initial stages the signal voltage is quite low so conventional bias methods are satisfactory. The last two stages 48 and 63 are positively biased by resistances 49 and 51 and resistances 66 and 64, respectively. In the preferred embodiment these resistances are all equal which places the two grids 47 and 62 at a potential half-way between ground and positive bus 28. To limit the current through the triodes resistances 58 and 73 are quite large, e.g., 10,000 ohms as opposed to smaller values of resistances 24 and 41. Hence, as the signal increases in amplitude the biasing is changed to accommodate this larger swing without accompanying distortion.

The output signal at terminal 74 is also fed back through capacitor 76 and resistance 77 and 78 to grid 81 of feedback triode 82. The cathode 83 of feedback triode 82 is tied to cathode 37 of triode 34. This allows negative feedback to be applied in an amplitude dependent upon the setting of sliding contact 79 on resistance 78 for the purpose of varying the bandpass or bandwidth of the amplifier. In the VLF range, as previously pointed out, the required pass band is normally quite narrow because of the necessity for phase modulation.

If, however, due to doppler or a slight shift of transmitter frequency, a wider pass band is necessary, this is accomplished by increasing the feedback, i.e., picking up more voltage on sliding contact 79 to introduce more degenerative feedback and thereby widen the bandwith. The bandwidth can, of course, be narrowed by lowering the amount of degenerative feedback and thereby reducing atmospheric noise pickup and the overall gain of the system.

It should be understood, of course, that the foregoing disclosure relates to only a preferred embodiment of the invention and that it is intended to cover all changes and modifications of the example of the invention herein chosen for the purposes of the disclosure which do not constitute departures from the spirit and scope of the invention. It is pointed out that transistors could replace the triode vacuum tubes illustrated and described which would operate in much the same manner as disclosed embodiment. Furthermore, any number of stages can be utilized as dictated by the environment in which the invention is used.

Obviously many modifications and variations of the present invention are possible in the light of the above teachings. It is therefore to be understood that within the scope of the appended claims the invention may be practiced otherwise than as specifically described.

What is claimed is:

1. A multi-stage amplifier having a common ground and adapted to pass an output signal of large dynamic range with negligible phase shift comprising:

a plurality of parallel connected, tuned active elements with parallel connected tuned input circuits, each of said active elements including a cathode, anode and a control element;

a plurality of coupling transformers each having a primary winding and a secondary winding;

the primary winding having a first terminal connected to a different one of said cathodes and a second terminal connected to ground; and the secondary winding having a first terminal connected to the control element of a following tuned active element and a second terminal connected to ground; and means for controlling the bandwidth of said amplifier, said means for controlling including an active control means responsive to an in-phase portion of said output signal and being connected in parallel with one said tuned active element.

2. An amplifier according to claim 1 wherein each said secondary winding comprises the inductive winding of one of said parallel tuned circuits.

References Cited by the Examiner

UNITED STATES PATENTS

| | | | |
|---|---|---|---|
| 1,700,393 | 1/1929 | Winther | 330—168 |
| 2,904,681 | 9/1959 | Jones et al. | 330—92 X |

FOREIGN PATENTS

| | | |
|---|---|---|
| 447,126 | 4/1949 | Italy. |

ROY LAKE, *Primary Examiner.*

NATHAN KAUFMAN, *Examiner.*